(12) United States Patent
Zenteno

(10) Patent No.: US 6,523,500 B1
(45) Date of Patent: Feb. 25, 2003

(54) ROTATING TETHER FOR SECURING AN ANIMAL

(76) Inventor: Roberto Zenteno, 15 Beaupre Crescent, N.W., Calgary, Alberta (CA), T3B 2S9

(*) Notice: Subject to any disclaimer, the term of this patent is extended or adjusted under 35 U.S.C. 154(b) by 0 days.

(21) Appl. No.: 09/627,228

(22) Filed: Jul. 27, 2000

(51) Int. Cl.$^7$ .............................................. A01K 27/00
(52) U.S. Cl. ..................... 119/796; 119/786; 119/787; 119/788; 119/789; 119/790; 119/791
(58) Field of Search ................................. 119/786, 787, 119/788, 789, 790, 796, 791

(56) References Cited

U.S. PATENT DOCUMENTS

| | | | |
|---|---|---|---|
| 474,928 A | 5/1892 | Steele | 242/379 |
| 1,060,439 A | 4/1913 | Duxstad | 119/787 |
| 2,647,703 A | 8/1953 | Hayes | 242/381.6 |
| 2,919,676 A | 1/1960 | Schneider | 119/796 |
| 3,123,052 A * | 3/1964 | Marshall | 119/789 |
| 3,198,175 A | 8/1965 | Dean | 119/789 |
| D216,897 S | 3/1970 | Meath | D30/116 |
| D269,301 S | 6/1983 | Deibert | D30/153 |
| D298,579 S | 11/1988 | Brummett | D30/153 |
| 5,022,351 A * | 6/1991 | Daniels | 117/789 |
| 5,526,774 A * | 6/1996 | Swindall, Jr. et al. | 119/787 |
| 5,732,659 A | 3/1998 | Wiggins | 119/787 |
| 5,785,007 A * | 7/1998 | Sawber et al. | 119/771 |
| 5,957,092 A * | 9/1999 | Colsch | 119/787 |

* cited by examiner

Primary Examiner—Charles T. Jordan
Assistant Examiner—Stephen Holzen
(74) Attorney, Agent, or Firm—I. Zborovsky

(57) ABSTRACT

The present invention provides a device for tethering an animal such that it has freedom to roam, yet is confined in an area that is devoid of fencing. A common problem with tethering is that the animal wanders, dragging a rope behind him, becoming entangled in the rope himself or the rope becoming entangled in objects within the animal's range. A common remedy of this problem is a retractable leash attaching to a tethering post. While prior retractors have solved the problem of entanglement, they had done little to resolve a second problem with tethering, that of an animal running to the limit of his tether only to be jerked by the neck when the tether suddenly becomes taut. The present invention offers a solution to both the entanglement and the jerk stop problems. To alleviate these two problems, the present invention is equipped with a recoil spring retractor in combination with a braking shoe which engages the retractor reel to gradually slow the play out of the line as it reaches its limit. A further improvement that the braking shoe offers is that of being able to adjust the length of deployable tether line by adjusting the point at which the brake engages. The present invention can also be used as a leash for walking an animal.

4 Claims, 4 Drawing Sheets

ROTATING TETHER FOR SECURING AN ANIMAL

BACKGROUND OF THE INVENTION

1. Field of the Invention

The present invention relates to animal care products, especially as they relate to leashes and tethers. More particularly, the invention comprises a rotating, retractable tether, with an automatic braking mechanism which slows deployment of the tether line as it approaches its limit, which may be mounted on a stake driven into the ground for use as an unattended tethering device.

2. Description of the Prior Art

Animal owners frequently find it desirable to be able to tether their animal such that it can be left unattended for a period of time, especially when they are away from a permanent installation that they may have at home. Over time, a number of efforts have been made to provide an easily portable tethering system whereby an animal has room to roam without fear of his becoming entangled in the tether line or having the line become entangled on the tethering post. Additionally, it is often desirable to be able to adjust the length of the tether to meet the requirements of various tethering sites.

U.S. Pat. No. 5,732,659, issued to James S. Wiggins on Mar. 31, 1998 relates a pet tether anchor wherein a stake is driven into the ground sufficiently to securely anchor an animal. A rotating sleeve is slipped over the stake and secured at its upper and lower limits by retaining pins which allow it to rotate around the stake without slipping off the top of the stake. A leash, chain, rope or metal cable can be attached to the rotating sleeve by way of a block and U-bolt. Unlike the present invention, Wiggins stake does not include a tether, but merely provides an anchor for a tether.

U.S. Pat. No. 474,928, issued to M. E. Steele on May 17, 1892, relates to a to a weighted tether wherein is a spring loaded, recoiling drum containing a coiled rope. A ratcheted wheel with an engaging detent is affixed to the shaft of the recoiling drum, allowing the tether to be set at a fixed length or fed out to accommodate the animals moving about. Steele's device was intended for tethering of carriage horses during stops, and as such was of considerable weight which, unlike the present invention makes it cumbersome for carrying.

U.S. Pat. No. 1,060,439 issued to H. L. Duxstad on Apr. 29, 1913 relates to a spring loaded, recoiling tether by which an animal can be staked out without fear of its becoming entangled in the tether rope. Duxstad's device comprises a rod of approximately 10', to one end of which an animal is tethered by a short length of rope. At the opposite end of the rod is a recoiling drum containing a coiled rope, the free end of which is attached to a grounding stake. As the recoiling drum nears the grounding stake its housing engages with the stake, with the rod attached thereto keeping the animal 10' from the stake. Unlike the present invention, Duxstad's device would prove cumbersome to a small animal, as well as bulky for the user to transport.

U.S. Pat. Nos. Des 216,897, issued to Delona J. Meath on Mar. 17, 1970; Des 269,301, issued to Daniel T. Deibert on Jun. 7, 1983; and Des 298,579, issued to Carl L. Brummett on Nov. 15, 1988, relate to retractable leashes in which the retracting unit is affixed to the animal's collar. In each instance, retraction is automatic whenever the leach goes slack, but, unlike the present invention, there is no braking action to gradually slow down the extension of the leash before it is completely played out. None of the above cited inventions provide a method for tethering the animal.

U.S. Pat. Nos. 2,647,703, issued to A. P. Hayes on Aug. 4, 1953; 2,929,676, issued to F. A. Schneider on Jan. 5, 1960; and 3,198,175, issued to J. H. Dean on Aug. 3, 1965 relate to hand held retractable leashes wherein retraction is automatic whenever the leash goes slack. Each of the above has a manually applied brake which limits the extension of the leash at the handler's discretion, but unlike the present invention, none have an automatic braking action to gradually slow down the extension before the leash is completely played out. Also unlike the present invention, none of the above provide a means for tethering an animal.

None of the above inventions and patents, taken either singly or in combination, is seen to describe the instant invention as claimed.

SUMMARY OF THE INVENTION

The present invention provides a device for tethering an animal such that it has freedom to roam, yet is confined to an area that is devoid of fencing. A common problem with tethering is that the animal wanders, dragging a rope behind him in which he becomes entangled himself or the rope becomes entangled in objects within the animal's range. A common remedy of this problem is a retractable leash attached to a tethering post. While prior retractors have solved the problem of entanglement, they have done little to resolve a second problem with tethering, that of an animal running to the limit of his tether only to be jerked by the neck when the tether suddenly becomes taut. The present invention offers a solution to both the entanglement and the jerk stop problems.

Accordingly, it is a principal object of the invention to provide a tethering system which can be conveniently carried for use while away from home.

It is another object of the invention to provide a tethering system which is secure from pulling loose from the ground.

It is a further object of the invention to a tethering system which will keep the animal from becoming entangled in the tether line.

Still another object of the invention is to provide a tethering system which will minimize the tangling of the tether line with objects with in the animal's range of mobility.

An additional object of the invention is to provide a tethering system which will gradually slow the deployment of the tether line as the animal reaches the limit of deployment in such a way as to minimize the jerking of the animal by the neck when he reaches the limit of deployment.

It is again an object of the invention to provide a tethering system which will allow for easily adjusting the limits of the deployment of the tether line.

Yet another object of the invention is to provide a tether line with easily read markers indicating deployment lengths.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

In tethering an animal, two primary problems arise concerning the tether line. First is the problem of entanglement, and second is the problem of the jerk stop when the animal reaches the limit of the tether. To alleviate these two problems, the present invention is equipped with a recoil spring retractor in combination with a braking shoe which engages the retractor reel to slow the play out of the line at is reaches its limit. A third problem that the present invention alleviates is that of allowing an animal the run of areas of varying sizes, which is resolved by allowing adjustable stop limits.

Figure 3:
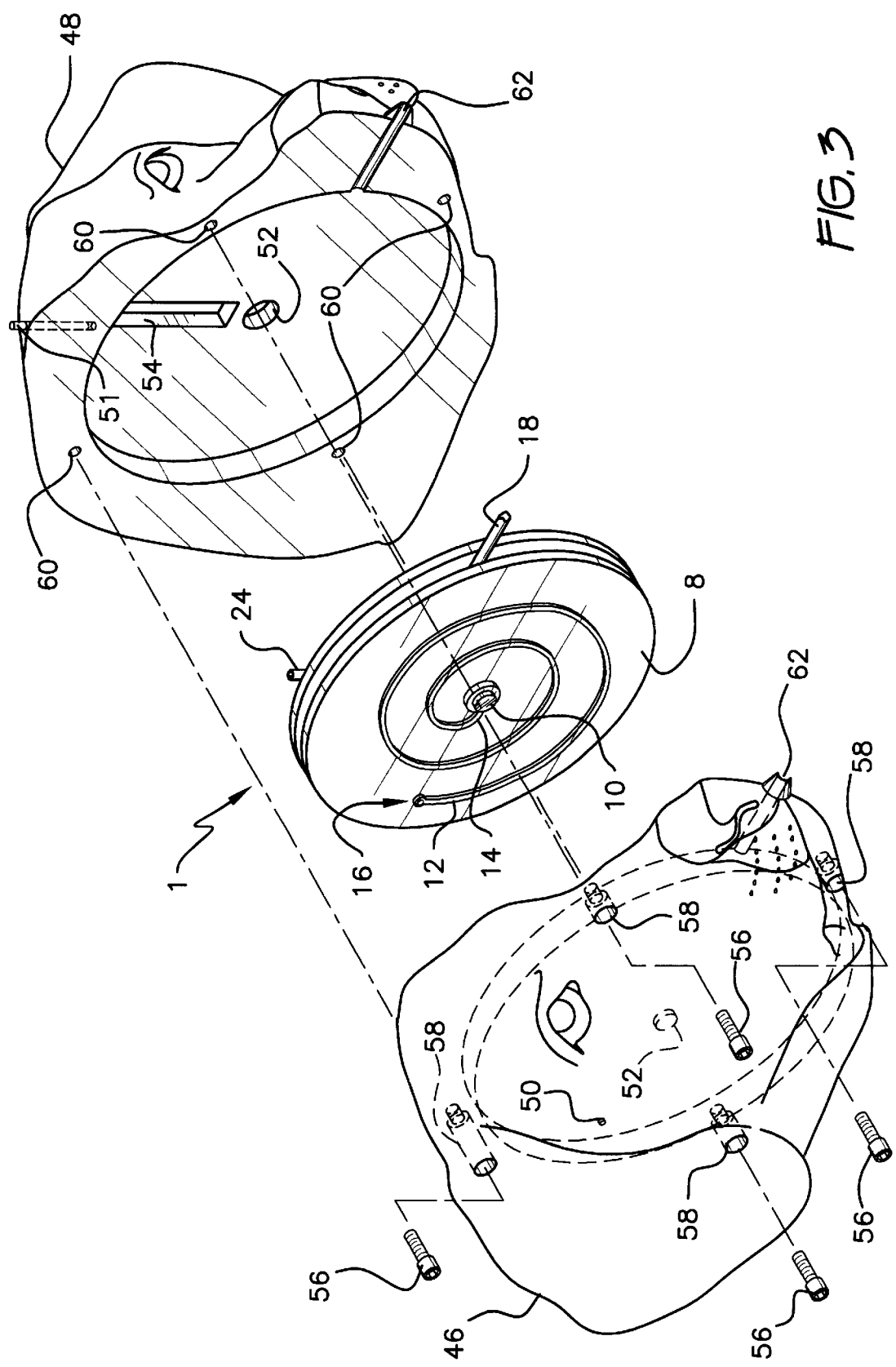
FIG. 3 is an exploded, environmental perspective of the reel case and retracting reel.

FIG. 3 shows the retractor reel assembly 1 with reel 8 rotatably attached to axle 10. Recoil spring 12 attaches at its central end 14 to reel 8 at a point near axle 10. Outer end 16 of recoil spring 12 attaches to left reel case 46 at retaining pin 50 as in FIG. 3. As tether line 18 is played out from reel 8, recoil spring 12 tightens to provide recoil action when tether line 18 becomes slack.

Figure 1:
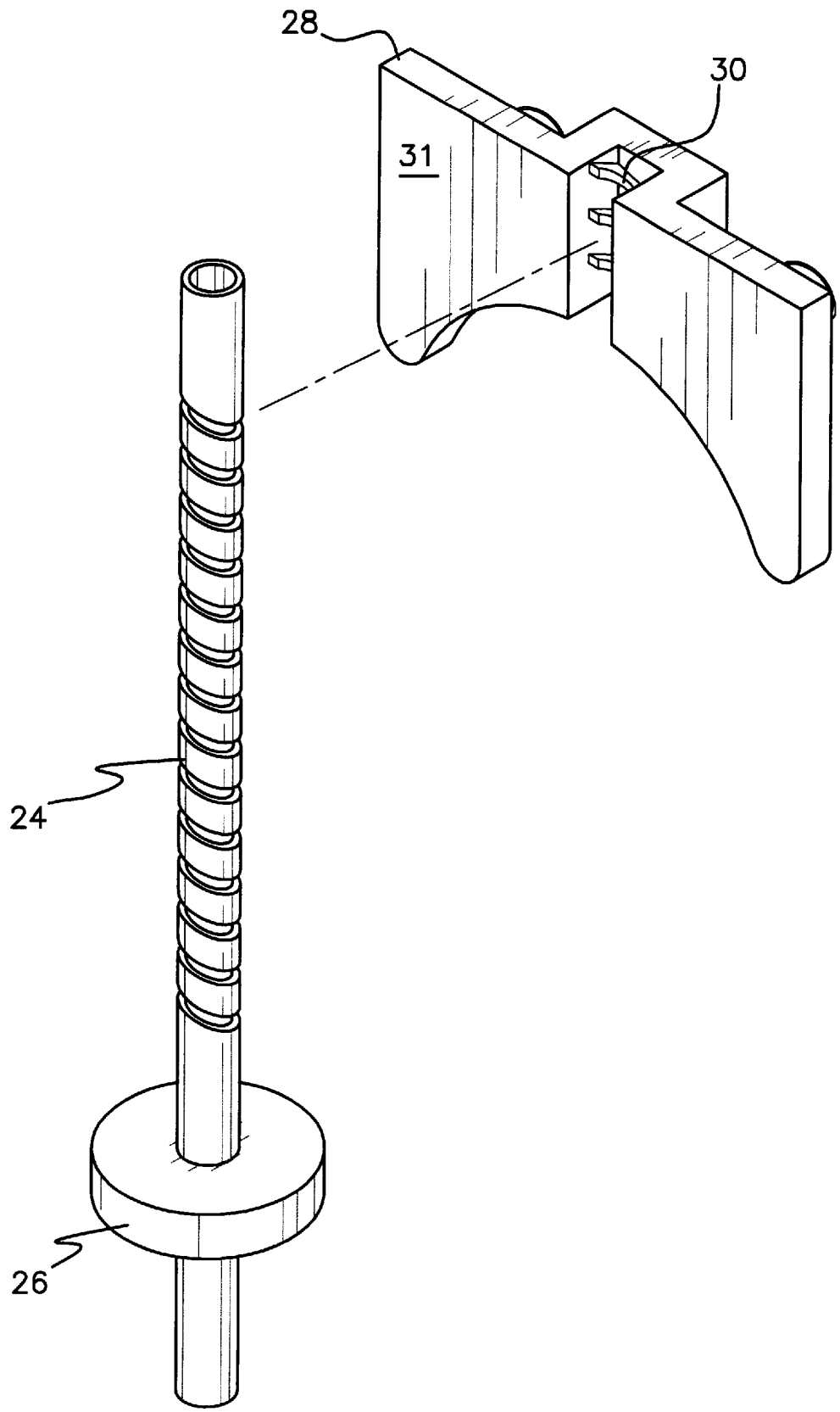
FIG. 1 is an exploded environmental perspective of the worm drive and brake shoe of the braking device.
Figure 2:
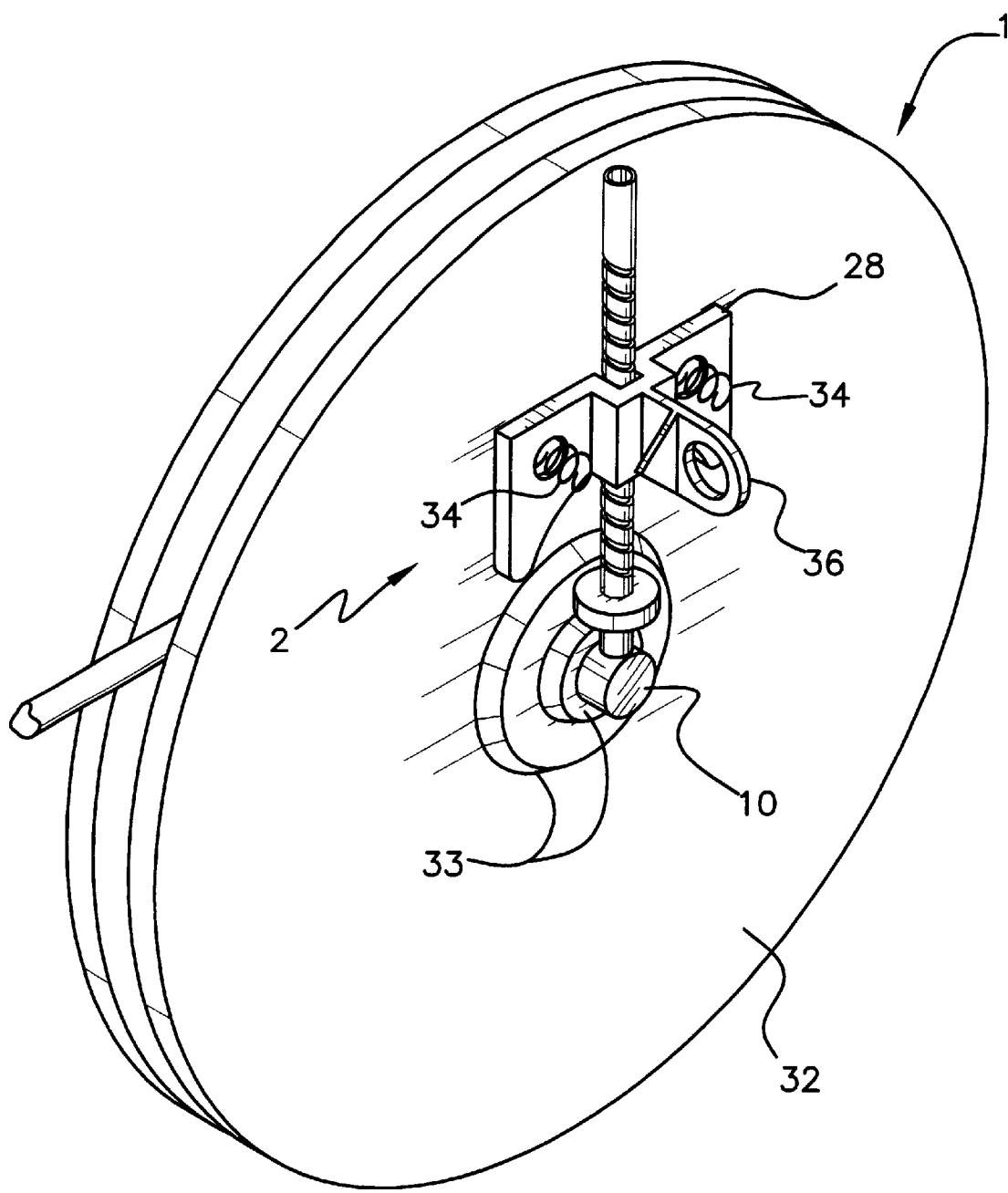
FIG. 2 is an environmental perspective of the braking device and the retraction reel.

Brake assembly 2, FIGS. 1 & 2, comprises worm gear 24, with friction drive wheel 26 firmly affixed proximate its lower end; and brake shoe 28, comprising half threads 30 to engage worm gear 24, shoe braking surface 31, helical tensioning springs 34, and adjustment slide 36. Shoe braking surface 31 engages reel braking surface 32, which is tapered in step 33 from the hub to a thinner rim. Helical tension springs 34 aid in maintaining contact between worm screw 24 and half threads 30 of brake shoe 28.

Brake assembly 2 mounts to retraction reel assembly 1 as in FIG. 2, with the lower end of worm gear 24 fitted into a hole in reel axle 10. A cavity in the upper end of worm gear 24 engages retaining pin 51 of right reel case 48.

Figure 4:
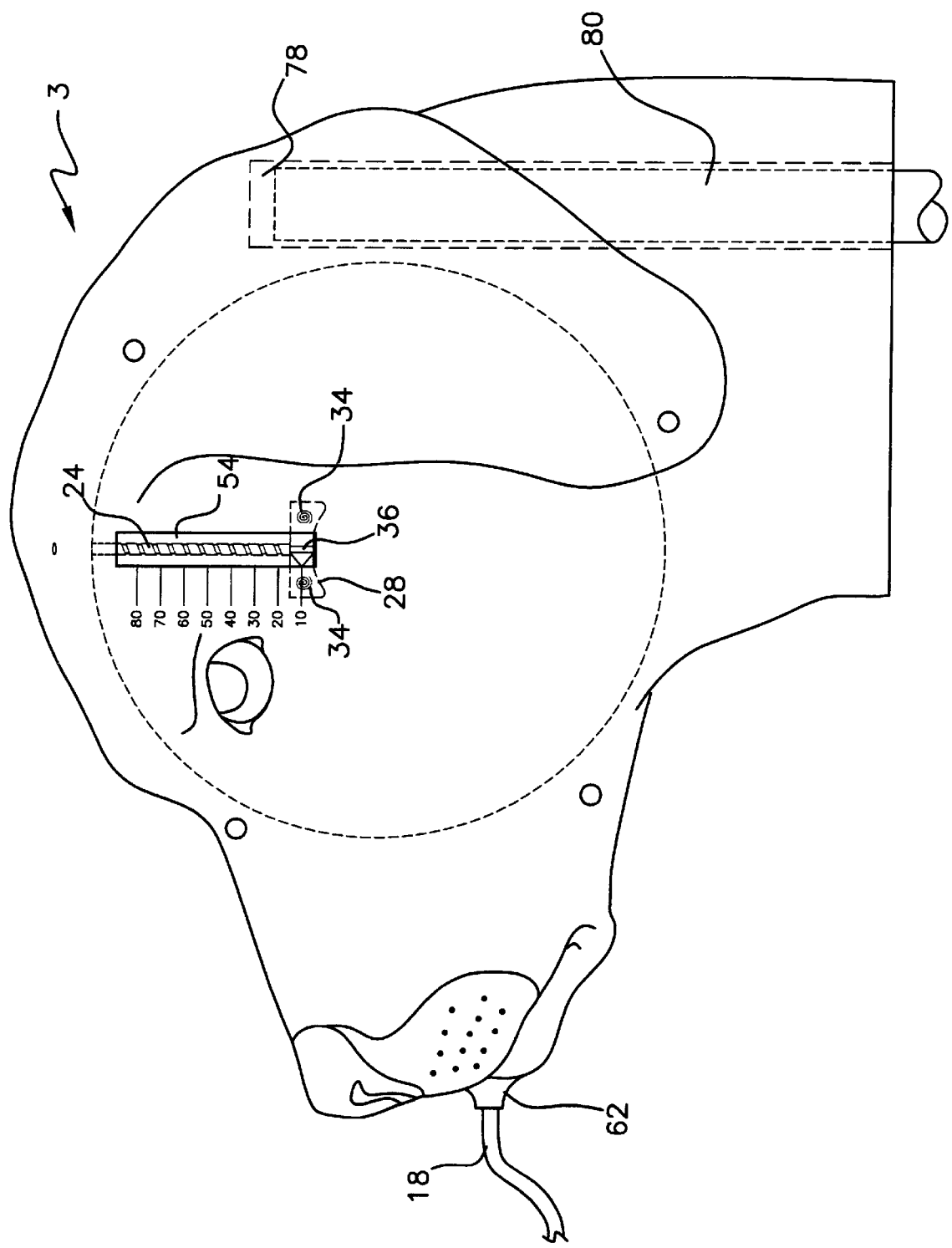
FIG. 4 is a plan of the rotating tether for securing an animal.

Left reel case 46 and right reel 48 case are joined surrounding retractor reel assembly 1, forming tether assembly 3, as in FIG. 4. Outer end 16 of recoil spring 12 is secured by retaining pin 50 in left reel case 46 and the cavity in the upper end of worm gear 24 is secured by retaining pin 51 in right reel case 48. The ends of reel axle 10 are engaged by reel axle case 48. The ends of reel axle 10 are engaged by reel axle retainers 52 in left reel case 46 and right reel case 48. Adjustment slide 36 is fitted through adjustment guide 54 in right reel case 48. Left reel case 46 and right reel case 48 are secured with screws 56 through screw holes 58 in left reel case 46 and into screw receptacles 60 in right reel case 48. Tether line 18 is deployed through the housing of tether assembly 3 via tether line aperture 62.

In operation, stake 80, FIG. 4, is securely driven into the ground and stake engagement sleeve 78 of tether assembly 3 is lowered over stake 80. Adjustment slide 36, protruding through adjustment guide 54 is pulled slightly, releasing half thread 30 of brake shoe 28 from engagement with worm gear 24. Adjustment slide 36 is slid up or down along worm gear 24 until the desired length of play of tether line 18 is indicated on adjustment guide 54. Releasing adjustment slide 36 allows helical tension springs 34 to re-engage half thread 30 of brake shoe 28 with worm gear 24. A fastener (not shown) on the end of tether line 18 is fastened to an animal's collar. As tether line 18 is played out by the animal moving further from tether assembly 3, recoil spring 12 winds tighter around axle 10 while, simultaneously, the worm gear turns from the friction between reel 8 and friction drive wheel 26, causing brake shoe 28 to move toward axle 10 of reel 8. As brake shoe 28 nears axle 10, shoe braking surface 31 engages step 33 of reel braking surface 32 causing helical tension springs 34 to exert pressure between shoe brake surface 31 and reel braking surface 32. This increased pressure creates a braking action, slowing the rate of play out of tether line 18, preventing the sudden jerk stop typical of other reels. As the animal approaches tether assembly 3, pressure between brake shoe 28 and reel 8 is decreased, simultaneously allowing recoil spring 12 to rewind tether line 18 onto reel 8.

It is to be understood that the present invention is not limited to the embodiments described above, but encompasses any and all embodiments within the scope of the following claims.

I claim:

1. A rotating tether for securing an animal comprising:
   a stake which can be driven into the ground, a tether rotatably attached to said stake,
   a tether line deployable from said tether, to which an animal can be secured,
   means for retracting said tether line,
   means for adjusting the deployable length of said tether line to a preset limit, and
   wherein said means for adjusting the deployable length of said tether line comprises:
      a reel,
      a worm gear and
      a half threaded brake assembly normally engaging said worm gear due to pressure exerted by
         helical tensioning springs,
         an adjustment, being incorporated into the back of said brake assembly and projecting through a slot in the housing of said tether, wherein
         said brake assembly can be disengaged from said worm gear and moved along said worm gear by an adjustment slide, the positioning of said half threads of said brake assembly on said worm gear determining the number of revolutions said reel can make before said brake assembly engages.

2. A rotating tether for securing an animal, as defined in claim 1, wherein said means for retracting said tether line comprises a recoil spring affixed to the reel and an axle of said reel of said tether.

3. A rotating tether for securing an animal comprising:
   a stake which can be driven into the ground, a tether rotatably attached to said stake,
   a tether line deployable from said tether, to which an animal can be secured,
   means for retracting said tether line,
   means for reducing the speed of deployment of said tether line as said tether line deployment nears said preset limit of deployment, wherein said means for reducing the speed of deployment of said tether line as said tether line deployment nears said preset limit of deployment comprises:

a reel, graduated by steps from a thinner rim to a thicker hub, a worm gear, a brake assembly normally engaging said worm gear due to pressure exerted by helical tensioning springs, wherein the deployment of said tether line from said reel causes said worm gear to turn, moving said brake assembly toward the hub of said reel, so that when said brake assembly comes into contact with said steps of said reel near said reels thicker hub, said helical tensioning spring exert increasing pressure on said brake assembly creating additional friction, slowing the progress of said reel.

4. A rotating tether for securing an animal, as defined in claim 3, wherein said means for retracting said tether line comprises a recoil spring affixed to the reel and an axle of said reel of said tether.

* * * * *